Patented Aug. 14, 1945

2,382,157

UNITED STATES PATENT OFFICE 2,382,157

PROCESS FOR PRODUCING CHROMATES

Leonard M. Kebrich, Brooklyn, N. Y., assignor to National Lead Company, New York, N. Y., a corporation of New Jersey No Drawing. Application January 8, 1942, Serial No. 425,980

9 Claims. (Cl. 23—56)

The present invention relates to the preparation of chromates, particularly heavy metal-alkali metal chromates, and has special reference to the preparation of compounds containing lead, barium, or other heavy metal chromates in combination with an alkali metal chromate.

Previously such compounds have been reported in the literature as being prepared by reactions in aqueous media. Such methods of preparation, however, entail a great deal of expense and would be uneconomical if operations were conducted on a large scale.

It is among the objects of my invention to provide a novel and economical process for the manufacture of chromates, particularly double chromates such as heavy metal-alkali metal chromates. My novel process is characterized by the fact that it is essentially a dry reaction which is very economical, since it avoids the handling of large quantities of solutions as well as filtering, drying, and the like, operations. Other objects and advantages of the present invention will become apparent from the following detailed description.

In its broadest aspects the invention contemplates mixing a metal compound such as a metal oxide or a metal compound, for example, a carbonate or a hydroxide, which on heating yields the oxide, with an alkali metal dichromate and heating the mixture in a suitable receptacle to a temperature between about 350° C. and about 700° C. The reaction between the metal oxide or the oxide-yielding metal compound begins to take place as soon as the proper temperature has been reached and is usually completed in about 20 minutes.

It has been found that the direct combination of components occurs near the melting point of the alkali metal dichromate employed, with the formation of a partly fused or sintered product. Thus it will be observed that while the reagents are in the dry state, a slight sintering usually takes place which renders the products practically dustless. The time required for the reaction, while usually ranging between 15 minutes to one hour cannot be definitely stated for every given case, since large batches of material will usually take a longer period of time, but those skilled in the art will be enabled, from the description of my invention herein set forth, to carry out my process with complete success.

In order that my invention may be fully understood, the following specific examples are given from which, however, no undue limitations should be deduced:

EXAMPLE I

Preparation of normal lead-potassium chromate

A ground mixture of 22.3 grams of lead monoxide and 29.4 grams of potassium dichromate (i. e., one-tenth mol of lead monoxide and one-tenth mol of potassium dichromate) was heated in a fire clay dish at about 500° C, for about 15 minutes until slight sintering occurred and the color changed noticeably from brownish yellow to red, which on cooling changed to a golden yellow. The sintered product after grinding was found to be normal lead-potassium chromate, $PbK_2(CrO_4)_2$, having a refractive index of 2.1 and a specific gravity of 4.3.

EXAMPLE II

Preparation of dibasic lead-potassium chromate

A ground mixture of 66.9 grams of lead monoxide and 29.4 grams of potassium dichromate (i. e., three-tenths mol of lead monoxide and one-tenth mol of potassium dichromate) was heated in a suitable dish at about 500° C. for about 15 minutes. The resultant sintered red-colored product was found to be dibasic lead-potassium chromate, $2PbO.PbK_2(CrO_4)_2$.

The products obtained in the above examples, being in a sintered condition, are novel and distinct from the colloidal products obtained by precipitation from aqueous solutions.

It will be understood from the foregoing that by varying the relative amounts of raw materials used, mixtures of the normal and basic salts are readily obtainable. Thus, equimolecular mixtures of normal and dibasic lead-potassium chromates may be obtained by heating together 2 mols of lead monoxide and 1 mol of potassium dichromate.

The present invention also contemplates the preparation of basic lead chromates of a greater basicity than the monobasic salt according to the method of the following example.

EXAMPLE III

Preparation of basic lead chromates

Six mols of lead monoxide per mol of potassium dichromate equivalent to the proportion of 133.8 grams of lead monoxide to 29.4 grams of potassium dichromate were mixed and ground, and the mixture heated to the temperature of about 500° C. for 15 minutes, thereby to form a sintered basic lead-potassium chromate. The potassium was then substantially quantitatively leached out of the resultant product by water as soluble potassium hydroxide, leaving an insoluble residue of lead chromate, the basicity of which corresponds to the empirical formula $2PbO.PbCrO_4$. It will be observed that the method of preparing basic lead chromates according to the present example involves the initial formation of a double chromate salt in the presence of an excess of lead monoxide.

Another feature of the present invention pertains to the preparation of compositions containing mixtures of red lead and double or single chromates, wherein the red lead may, if desired, be prepared in situ. Compositions of this type may be made according to the following examples.

EXAMPLE IV

*Preparation of a mixture of red lead and lead-potassium chromate*

100 grams of commercial red lead of low true red lead content containing 25.5% $Pb_3O_4$ and the balance lead monoxide, PbO, were intimately ground and mixed with 98.5 grams of potassium dichromate and heated in a suitable receptacle at about 430° C. for about one hour. The product was found to be a mixture of red lead and lead-potassium chromate.

EXAMPLE V

*Preparation of a mixture of red lead and basic lead chromate involving the in situ formation of red lead*

Twenty mols of lead monoxide were mixed with one mol of potassium dichromate and heated at about 430° C. for a period of about twenty-four hours. There was thus formed a mixture of red lead and basic lead-potassium chromate. The potassium was then extracted with water as soluble potassium hydroxide, leaving an insoluble residue of basic lead chromate mixed with red lead. It will be understood by those skilled in the art that the lead monoxide, PbO, oxidized during the reaction to red lead, $Pb_3O_4$. Since this example contemplates the formation of red lead in situ, it is to be noted that a relatively long period of time is required for the reaction.

It is to be understood that the processes of the foregoing examples may be conducted either continuously or as a batch operation. Further, it is to be understood that, while the foregoing examples show the use of lead oxide and potassium dichromate in the preparation of various lead-chromates and double chromates, other lead compounds such as lead carbonate or lead hydroxide and other alkali metal dichromates such as sodium dichromate may also be employed. Likewise, in place of lead compounds, other metal compounds such as the oxides or compounds, which on heating yield oxides, of barium, calcium, titanium, zinc, iron, mercury, aluminum and nickel may be employed with alkali metal dichromates to form corresponding double chromate salts or mixtures. Thus, for example, barium-potassium chromate may be prepared according to the following example.

EXAMPLE VI

*Preparation of barium-potassium chromate*

197.4 grams of barium carbonate were intimately mixed and ground with 294.2 grams of potassium dichromate (i. e., one mol of barium carbonate and one mol of potassium dichromate) and the mixture heated in a fire clay dish to about 500° C. for about 15 minutes. The resulting novel product was in a sintered condition. On cooling it had a light yellow color, was found to be the double salt of barium-potassium chromate, and had a refractive index of 1.9 and a specific gravity of 3.7.

While the temperature for carrying out the reactions between the heavy metal compounds and the alkali metal dichromates may range between about 350° C. and about 700° C., it was found that the reaction involving the lead compounds took place more quickly at temperatures ranging from about 550° C. to about 700° C. The time of the operation will vary somewhat in bringing the mass to the proper reaction temperature. Usually one half hour will be sufficient even for a large commercial batch operation after which the reaction is completed in a short time. However, it is to be borne in mind that where red lead is present the temperatures employed in carrying out the reaction should be below the temperature at which red lead decomposes. In this latter case temperatures of the order of 430° C. have been found to be satisfactory. Likewise, it is to be observed that where red lead is to be formed in situ in making red lead and lead chromate mixtures as set forth in Example V, longer periods of time will be required in order to effect the conversion of lead monoxide to red lead.

Furthermore, it will be obvious that the process on a large scale may be conducted in furnaces of various types, preferably a rotary type of furnace with a suitable refractory lining, after which either air-cooling or water-cooling may be employed.

The chromates and chromate-red lead mixtures of the present invention have been found to be useful as metal-priming pigments. Chromate-red lead mixtures, lead-potassium chromate and barium-potassium chromate either alone or in combination with other pigments have been found to be especially desirable in the formulation of metal-priming paints. Moreover, as hereinabove pointed out, it is to be appreciated that the sintered lead-potassium chromate and barium-potassium chromate of the present invention are novel products.

Having thus described my invention, I claim as new and useful the following:

1. A method for preparing double chromate salts which comprises admixing a metal compound from the group consisting of the oxides, hydroxides, and carbonates of lead, barium, calcium, titanium, zinc, iron, aluminum and nickel with an alkali metal dichromate, and heating the said mixture at a temperature between about 350° C. and about 700° C. for a time sufficient to form a sintered heavy metal-alkali metal chromate.

2. A method for preparing a lead-potassium chromate salt which comprises admixing in a ground condition lead oxide and potassium dichromate, and heating the said mixture at a temperature between about 350° C. and about 700° C. for a period of time sufficient to form sintered lead-potassium chromate.

3. A method for preparing a normal lead-potassium chromate which comprises admixing in a ground condition lead monoxide and potassium dichromate in the ratio of one mol of lead monoxide to one mol of potassium dichromate, and heating the said mixture at a temperature of about 500° C. for a period of time sufficient to form a sintered normal lead-potassium chromate.

4. A method for preparing a dibasic lead-potassium chromate which comprises admixing in a ground condition lead-monoxide and potassium dichromate in the ratio of 3 mols of lead monoxide to one mol of potassium dichromate and heating the said mixture at a temperature of about 500° C. for a period of time sufficient to form a sintered dibasic lead-potassium chromate.

5. A method for preparing a lead-sodium chromate which comprises admixing in a ground condition lead carbonate and sodium dichromate and heating the said mixture at a temperature between about 350° C. and about 700° C. for a period of time sufficient to form sintered lead-sodium chromate.

6. A method for preparing a barium-potassium chromate which comprises admixing in a ground condition barium carbonate and potassium dichromate and heating the said mixture at a temperature between about 350° C. and about 700° C. for a period of time sufficient to form sintered barium-potassium chromate.

7. A method for preparing a basic lead chromate of greater basicity than the monobasic salt which comprises admixing in a ground condition lead monoxide and potassium dichromate in the ratio of at least 6 mols of lead monoxide to one mol of potassium dichromate, heating the said mixture at a temperature of about 500° C. until a sintered basic lead-potassium chromate is formed and leaching out the potassium with water.

8. A method for preparing a mixture of red lead and lead-potassium chromate which comprises admixing in a ground condition potassium dichromate and red lead containing lead monoxide and heating the said mixture at a temperature of about 430° C. until a red lead and lead-potassium chromate mixture is obtained.

9. A method for preparing a mixture of red lead and basic lead chromate which comprises admixing in a ground condition lead monoxide and potassium dichromate, heating said mixture at a temperature of about 430° C. for a period of time sufficient to form a mixture of red lead and basic lead-potassium chromate and leaching out the potassium with water.

LEONARD M. KEBRICH.